Aug. 31, 1954  P. A. MARZILLIER  2,687,538
BED LEG INTERLOCK WITH A FIXED BASE
Filed May 14, 1953

INVENTOR.
PAUL A. MARZILLIER
BY
Wheeler, Wheeler & Wheeler
ATTORNEYS

Patented Aug. 31, 1954

2,687,538

UNITED STATES PATENT OFFICE 2,687,538

BED LEG INTERLOCK WITH A FIXED BASE

Paul A. Marzillier, Milwaukee, Wis.

Application May 14, 1953, Serial No. 354,947

6 Claims. (Cl. 5—317)

This invention relates to a bed leg interlock with a fixed base.

In my companion application, Serial Number 32,906, filed June 14, 1948, I have disclosed a wardrobe unit in which a bed may be stored and from which the bed may be bodily removed to be rolled on its own casters to any desired position of use. While the present invention is not limited to such a device, reference in general terms to this field of use will exemplify the utility of the present organization.

The present organization comprises a base having sockets which pivotally receive studs projecting from the bed roller fixture. The studs may be extensions of the pintle upon which the roller is journaled at the foot of the bed leg. With the bed horizontal, and its leg upright, these studs may be freely moved into and from the receiving notches of the base; but in order that the bed leg may be interlocked with the base to preclude such removal except in the predetermined leg position, I provide arcuate bosses or flanges on the leg and the base which disengage to permit leg removal in the selected position, but which are interlockingly engaged in all other pivotal movements of the leg to hold the studs in their bearing seats.

Since the invention is not to be understood to be limited to a folding bed or wardrobe, it will be understood that the base 7 may take any desired form. Desirably it comprises a transversely extending channel from one side of which extends a ramp at 8, the channel being provided at appropriate points with slots at 9 to receive peripheral portions of the rollers or wheels 10 with which the bed leg 11 is provided.

Figure 6:
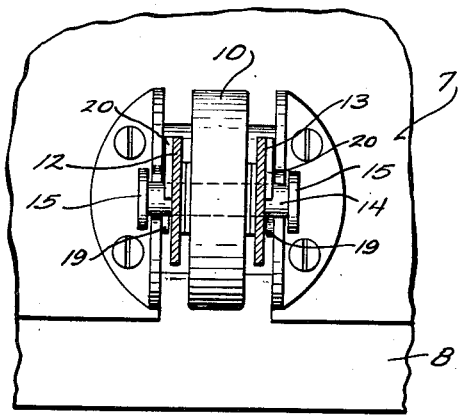
Fig. 6 is a view taken in section on the line 6—6 of Fig. 1.

The lower extremity of the bed leg 11 is bifurcated to comprise parallel arms 12 and 13 between which the roller 10 is disposed. Spanning the space between arms 12 and 13 of the bed leg is a pintle 14 upon which the roller 10 is journaled and which projects beyond arms 12 and 13 and is provided with heads 15, as best shown in Fig. 6.

Figure 4:
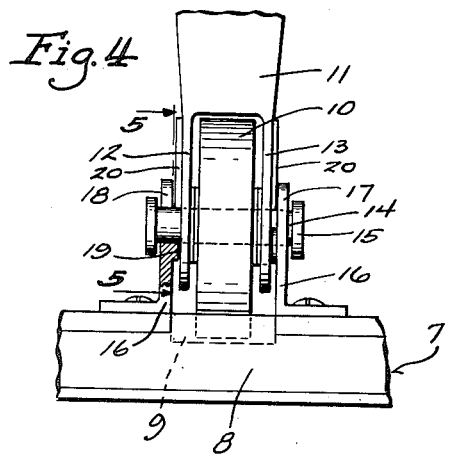
Fig. 4 is a view taken in section on the line 4—4 of Fig. 1.
Figure 3:
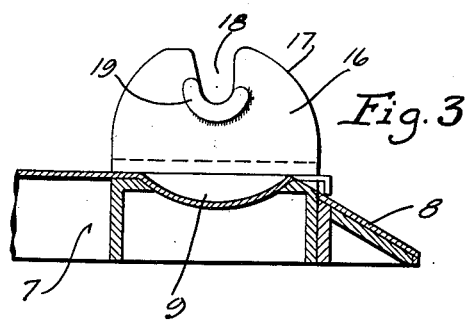
Fig. 3 is a view in section parallel to the elevation illustrated in Fig. 1 showing the inner face of one of the notched base flanges as it appears in the absence of the leg.

Angle brackets 16 are fastened to the base 7 and project upwardly therefrom. These desirably have arcuately curved upper margins at 17 which are notched at 18 to receive the pintle 14, the heads 15 lying outside the brackets 16, as clearly appears in Fig. 4.

Figure 1:
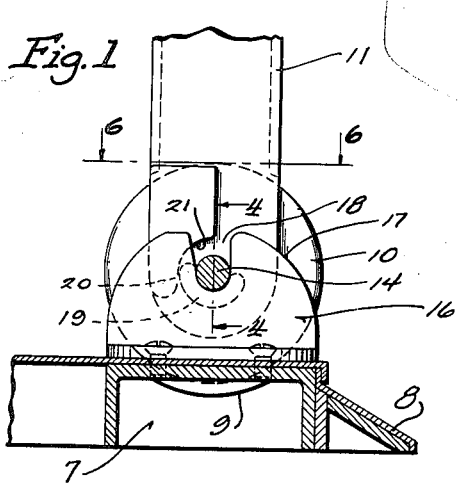
Fig. 1 is a view in side elevation showing a bed leg engaged in the notch of a base.
Figure 2:
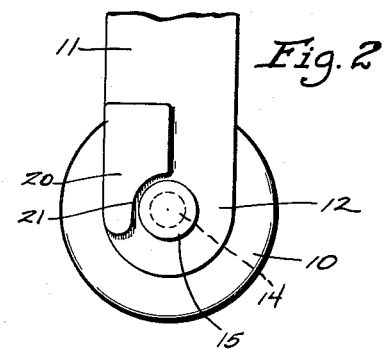
Fig. 2 is a view in side elevation as it appears when disengaged from the base.
Figure 5:
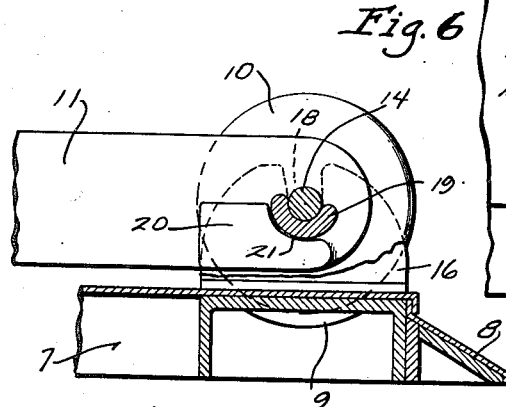
Fig. 5 is a view taken in section on the line 5—5 of Fig. 4 but showing the leg angularly displaced from the position in which the leg appeared in Figs. 1 and 4.

Each of the brackets 16 is provided on its inner face with a boss 19 desirably having the lozenge shaped form illustrated in the drawings. The bifurcated arms 12 and 13 of the bed leg 11 have an oppositely formed boss 20 with an arcuate inner margin at 21 lying in the plane of the boss 19 but normally disengaged therefrom when the bed leg is upright as shown in Fig. 1. With the pintle 14 engaged in the bearing notches 18 of brackets 16, it will be evident that any pivotal movement of the leg in a clockwise direction, as viewed in Fig. 1, toward the position in which the leg is illustrated in Fig. 5 will cause the arcuate surface 21 of the boss 20 to move behind and beneath the lozenge shaped boss 19 of the brackets 16, thereby securely interlocking the bed leg with the brackets to permit continued pivotal movement of the parts but to restrain the leg against any withdrawal of pintle 14 from the supporting notches 18 of the base brackets 16 in which the bed is pivotally supported for tilting movement.

When the bed is horizontal and its legs upright, the legs may readily be lifted from the base and the rollers 10 will either rest immediately upon the floor or, if they are deposited on ramp 8, will readily roll down such ramp to the floor. Likewise, in restoring the bed into position for tilting movement on the base, the rollers 10 will readily ride up ramp 8 until the supporting pintle 14 rides over the curved surfaces 17 of the brackets and drops into the notches 18 thereof. In this position, the bed is restrained against translative movement on its rollers but may readily be pivoted and may also readily be lifted to free it from the base. However, the slightest pivotal movement of the bed in a direction to tilt its leg counterclockwise, as viewed in Fig. 1, will immediately interlock the legs with the base to preclude any accidental displacement of the pintles from the bearing surfaces provided by the margins of the brackets at notches 18.

I claim:

1. The combination with a bed having a leg provided with a stud for the support of the bed for pivotal movement, of a base provided with an upstanding bracket having a notch in which the stud is engaged for such movement, and from which the stud is freely disengageable with the bed leg upright, said bed leg and bracket having complementary parts of arcuate conformation normally disengaged in the upright position of the leg and engageable upon pivotal movement of the leg about the axis of its stud, said parts being interlocking when engaged to preclude withdrawal of the stud from the notch of the bracket.

2. The device of claim 1 in which the stud comprises a roller pintle, said leg being provided with a roller upon which it is movable when the pintle is not engaged with the bracket of the base.

3. The combination with a furniture leg of a base on which such leg is detachably mounted, said base comprising a pair of spaced brackets having upwardly opening notches and the leg having stud means projecting laterally and positioned in the notches, the notches serving as a bearing for said stud means whereby said leg is pivotally movable about the axis of the stud means, the said leg and at least one of said brackets having complementary arcuate flanges of differing radius and in angularly offset positions, the said flanges permitting free movement of said studs into and from the notches when the leg is upright, the flange means of the leg being rotatable with the leg about the axis of the stud means into interlocking engagement beneath the bracket flange means whereby to preclude withdrawal of said studs from the bracket notches when the leg is in a position in which it has been pivotally displaced from said upright position.

4. The device of claim 3 in which the leg is bifurcated and provided with a roller having a pintle spanning the bifurcation and having projecting ends constituting said studs, the periphery of the roller projecting beyond said leg for the rolling support thereof when the studs are disengaged from said brackets.

5. The device of claim 4 in which said base is provided with a pocket between said brackets in which said roller is received when the studs are in the notches of the brackets.

6. The device of claim 4 in which said base has a ramp to support the roller for assistance in re-positioning the studs in the notches of the brackets, the brackets having inclined marginal surfaces leading to said notches and disposed in supporting relation to said studs to receive said studs and support the weight of the leg after the roller encounters the ramp.

References Cited in the file of this patent

UNITED STATES PATENTS

| Number | Name | Date |
| --- | --- | --- |
| 326,470 | Young | Sept. 15, 1885 |
| 342,970 | Ongley | June 1, 1886 |
| 706,209 | Sumner | Aug. 5, 1902 |
| 1,433,922 | Williams | Oct. 31, 1922 |
| 1,543,723 | Rivitz | June 30, 1925 |

FOREIGN PATENTS

| Number | Country | Date |
| --- | --- | --- |
| 92,224 | France | July 18, 1871 |